(12) United States Patent
Henkel et al.

(10) Patent No.: US 9,413,170 B2
(45) Date of Patent: Aug. 9, 2016

(54) REDUNDANT MODULE WITH SYMMETRICAL CURRENT PATHS

(75) Inventors: Hartmut Henkel, Blomberg (DE); Michael Heinemann, Lage (DE); Andreas Neuendorf, Steinheim (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 988 days.

(21) Appl. No.: 13/521,428

(22) PCT Filed: Jan. 13, 2011

(86) PCT No.: PCT/EP2011/000111
§ 371 (c)(1),
(2), (4) Date: Jul. 10, 2012

(87) PCT Pub. No.: WO2011/085980
PCT Pub. Date: Jul. 21, 2011

(65) Prior Publication Data
US 2012/0292999 A1    Nov. 22, 2012

(30) Foreign Application Priority Data
Jan. 13, 2010   (DE) .......................... 10 2010 004 644

(51) Int. Cl.
*H02J 1/10* (2006.01)
*G05F 1/56* (2006.01)

(52) U.S. Cl.
CPC . *H02J 1/108* (2013.01); *G05F 1/56* (2013.01); *H02J 1/102* (2013.01); *Y10T 307/50* (2015.04); *Y10T 307/549* (2015.04); *Y10T 307/724* (2015.04)

(58) Field of Classification Search
USPC ........................................................ 307/52
See application file for complete search history.

(56) References Cited

U.S. PATENT DOCUMENTS

| | | | |
|---|---|---|---|
| 4,618,779 | A | 10/1986 | Wiscombe |
| 5,672,958 | A | 9/1997 | Brown et al. |
| 6,181,117 | B1 | 1/2001 | Iafrate et al. |
| 6,483,682 | B1 | 11/2002 | Reynolds |
| 2005/0078424 | A1 | 4/2005 | Yamamura et al. |

(Continued)

FOREIGN PATENT DOCUMENTS

| | | |
|---|---|---|
| CN | 1617406 A | 5/2005 |
| DE | 19722127 | 7/1998 |

(Continued)

OTHER PUBLICATIONS

"Several Practical Designs of a Low-voltage Redundant Power Supply Scheme", Zhang Xiaojian et al., Applications of MCU and Embedded System, Issue 11 of 2009, pp. 8-11, Nov. 1, 2009.

*Primary Examiner* — Rexford Barnie
*Assistant Examiner* — Dru Parries
(74) *Attorney, Agent, or Firm* — Lucas & Mercanti, LLP; Klaus P. Stoffel

(57) ABSTRACT

The invention relates to a redundant module for decoupling short-circuit currents in a redundant voltage supply. The redundant module comprises at least two power supply units, and the number of inputs corresponds at least to the number of power supply units. Each input is routed via a separate current path to a common current node of an output for providing an output current. Each current path forms a decoupling section, and at least one measuring element for measuring the input voltage, the input current, and/or the input power as well as a control element for regulation purposes are assigned to each decoupling section.

15 Claims, 5 Drawing Sheets

(56) References Cited

U.S. PATENT DOCUMENTS

| | | |
|---|---|---|
| 2007/0273216 A1 | 11/2007 | Farbarik |
| 2009/0322156 A1 | 12/2009 | Gscheidle et al. |

FOREIGN PATENT DOCUMENTS

| | | |
|---|---|---|
| JP | S61039826 | 2/1986 |
| JP | S62012332 | 1/1987 |
| JP | H02208708 | 8/1990 |
| JP | H09327120 | 12/1997 |
| JP | H10191565 | 7/1998 |
| JP | 2005086883 | 3/2005 |
| JP | 2008053055 | 3/2008 |
| JP | 2008228487 | 9/2008 |
| WO | 9836340 | 8/1998 |
| WO | 03032104 | 4/2003 |
| WO | 2007140203 | 12/2007 |

US 9,413,170 B2

REDUNDANT MODULE WITH SYMMETRICAL CURRENT PATHS

The present application is a 371 of International application PCT/EP2011/000111 filed Jan. 13, 2011, which claims priority of DE 10 2010 004 644.2, filed Jan. 13, 2010, the priority of these applications is hereby claimed and these applications are incorporated herein by reference.

BACKGROUND OF THE INVENTION

The present invention relates to a redundant module for decoupling short-circuit currents in a redundant voltage supply.

In electrical systems, machines, or devices which are subject to high requirements in terms of availability and reliability, control and safety related functions are provided by redundant voltage supplies. This redundancy is, for example, ensured by at least two coupled power supply units which feed the respective devices in parallel operation. The output power of the individual power supply units is dimensioned such that at least in case of failure of one of the power supply units, the required electric power is provided by the remaining power supply units.

The parallel-connected, power supply units are routed to a common current node at the output side, from which the total electrical power provided is distributed to respective consumers of a system, machine, or device. In order for the common current node, in the event of a short-circuit at the output side in any of the power supply units which could occur as a result of a defect in the power supply unit, to be not loaded by the resulting short-circuit current, it is necessary for this case to decouple the power supply units from one another. To this end, generally, so called redundant modules are used which provide a separate input for each of the power supply units to be connected in parallel, each of these inputs being routed to a common output, via a decoupling diode. Such a circuit, also known as an O-ring circuit, decouples a short-circuited power supply unit from the common current node at the output of the redundant module, into which node in normal operation all parallel power supply units feed its output current. If, for example, in a short-circuit event the output voltage of a power supply unit drops to zero potential, the result is a negative voltage drop between the corresponding input and the current node at the output of the redundant module, so that the decoupling diode blocks a possible short-circuit current.

In order to have a lowest possible power dissipation at the decoupling diodes in normal operation, a redundant module typically uses Schottky diodes which exhibit a low forward voltage of about 400 mV. Corresponding redundant modules are also known in form of so-called. O-ring diodes as integrated devices.

A disadvantage of the known redundant modules is that the parallel operated redundant power supply units are unevenly loaded when feeding into the common current node, which shortens the operating life of individual power supply units. Another disadvantage of known redundant modules is that the operability of the decoupling diodes and the presence of redundancy cannot be monitored.

SUMMARY OF THE INVENTION

An object of the invention is to provide a redundant voltage supply with at least two power supply units, which significantly increases the availability of systems, machines, or devices, and which in particular avoids the disadvantages mentioned above.

To achieve this object, the present invention proposes a redundant module for decoupling short-circuit currents in a redundant voltage supply having at least two power supply units.

The redundant module has a number of inputs which is at least equal to the number of power supply units, and each input is routed via a separate current path to a common current node of an output for providing an output current, and each of the current paths forms a decoupling section. Each decoupling section has at least one measuring element associated therewith, for measuring the input voltage, the input current, and/or the input power, and a control element for regulation purposes.

Such a redundant module allows advantageous regulation of the path currents and voltage drops of each decoupling section.

The measuring elements and control elements may be connected to a control and regulation device which is adapted to regulate the current, voltage, and/or power.

The present invention provides a redundant module with active decoupling sections which allow to regulate the currents in the current paths between the respective number of inputs and the common current node at the output of the redundant module, so that the total current that is provided at the output of the redundant module can be distributed symmetrically into equal path currents, or can be distributed into predefined different path currents.

The control and regulation device may be implemented, for example, in a microcontroller which comprises digital-to-analog converters for driving the control elements and acquiring measurement data.

The control and regulation device may be adapted to distribute the output current symmetrically or into currents with defined ratios.

The control element may comprise a MOSFET, and the measuring element may comprise a measuring resistor, wherein the MOSFET and the measuring resistor are connected in series in the current path of the decoupling section.

A measuring resistor which is connected in series with a MOSFET in a decoupling section can determine the current flowing through the current path of a decoupling section from the voltage drop, which current serves as a parameter for current regulation. Advantageously, with such a current measurement a low resistance measuring resistor can be used as a measuring element in the current path, so that power dissipation in the decoupling section is low.

As an alternative to an ohmic measuring resistor, a diode connected in series with the MOSFET can be used to sense the path current in the decoupling section. Also, inductive current measurement is possible.

Instead of current measurement, it is within the scope of the invention to detect the voltage at the output of each control element, so that the control element may be voltage-controlled.

Generally, other controllable semiconductor components are also suitable as control elements, such as IGBTs, or bipolar transistors.

In the redundant module, a diode may be connected in parallel to the MOSFET of each decoupling section to protect the transistor from overcurrents which might be caused for example by a short-circuit at the output of the redundant module.

Preferably, the measuring element of each decoupling section may have a sense amplifier associated therewith. The sense amplifier can detect very low voltage differences at the measuring resistance and process them for the control and regulation device. This allows the use of extremely low-resistance measurement resistors, for further reduction of power dissipation in a decoupling section.

The decoupling sections may additionally include measuring elements for monitoring the temperature and the input voltage, which elements are connected to the regulation device. The decoupling sections may thus be monitored by the control and regulation device.

Due to its regulation device, the redundant module is adapted to detect a failure or a short-circuit of a power supply unit at the input of each decoupling section, and to switch off an affected current path by blocking the transistor in the respective current path.

Due to such active decoupling of short-circuits at the input side, the present invention allows a decoupling diode in the respective current paths to be eliminated.

Of course, instead of active decoupling, decoupling of short-circuit currents using a Schottky diode may still be provided.

The control and regulation device of a redundant module may comprise a number of digital and/or analog interfaces adapted for diagnosis, programming, and parameterization, as well as for communication with other control and regulation devices of a system, machine or device.

Thus, for example, failures of individual redundant power supply units or an imminent thermal overload of a decoupling section can be signaled, so that a system, machine, or device can be brought into a safe state, if necessary.

A redundant module may have at least a second redundant module connected in parallel to the output, the parallel-connected redundant modules being adapted to communicate with each other and to provide a common control for a symmetrical or predefined current distribution to all, decoupling sections.

Thus, the invention provides for a distributed redundant power supply through a common bus bar or power line, while enabling symmetrical distribution of the currents, or power, respectively, to all power supply units, due to the communication of the control and regulation devices. This is particularly advantageous when retrofitting additional power supply units.

The invention further comprises a method for providing a redundant voltage supply having at least two power supply units and a redundant module according to the invention, comprising the steps of:
(a) determining the input voltages applied at the decoupling sections;
(b) disabling the control elements in those decoupling sections, at which no voltage is applied;
(c) determining the decoupling section which has the lowest positive input voltage applied at its input;
(d) adjusting the control element in the current path of the decoupling section at which the lowest positive input voltage is provided to a minimum resistance value;
e) determining path current, voltage, and/or power measurement data in all decoupling sections;
(f) regulating the control elements of the at least one further decoupling section, wherein the measured value of the decoupling section at which the lowest input voltage is applied is determined as the target value for a respective regulation.

The control element may be regulated in function of the current flowing through the decoupling section.

The absolute amount of current in each of the regulated current paths results from the total current flowing through the output to the connected load.

The current path of the decoupling section at which the lowest input voltage is detected is not regulated, so that the corresponding path current can be supplied as a reference value for the target value of each regulation of the at least one further current path. By regulating the deviations, a balance of currents among the paths is established.

Alternatively, the control element is regulated in function of its output voltage.

The method allows to continuously monitor the input voltages at the inputs of the redundant module, so that in case of failure or short-circuit of a power supply unit the associated decoupling section is cut off. In this way it can be removed from the regulation scheme, so that the system, machine, or device maintains its power supply through the power supply units remaining in the regulation scheme.

BRIEF DESCRIPTION OF THE DRAWING

The invention will now be described in detail with reference to exemplary embodiments and to the accompanying drawings, wherein.

DETAILED DESCRIPTION OF THE INVENTION

Figure 1:
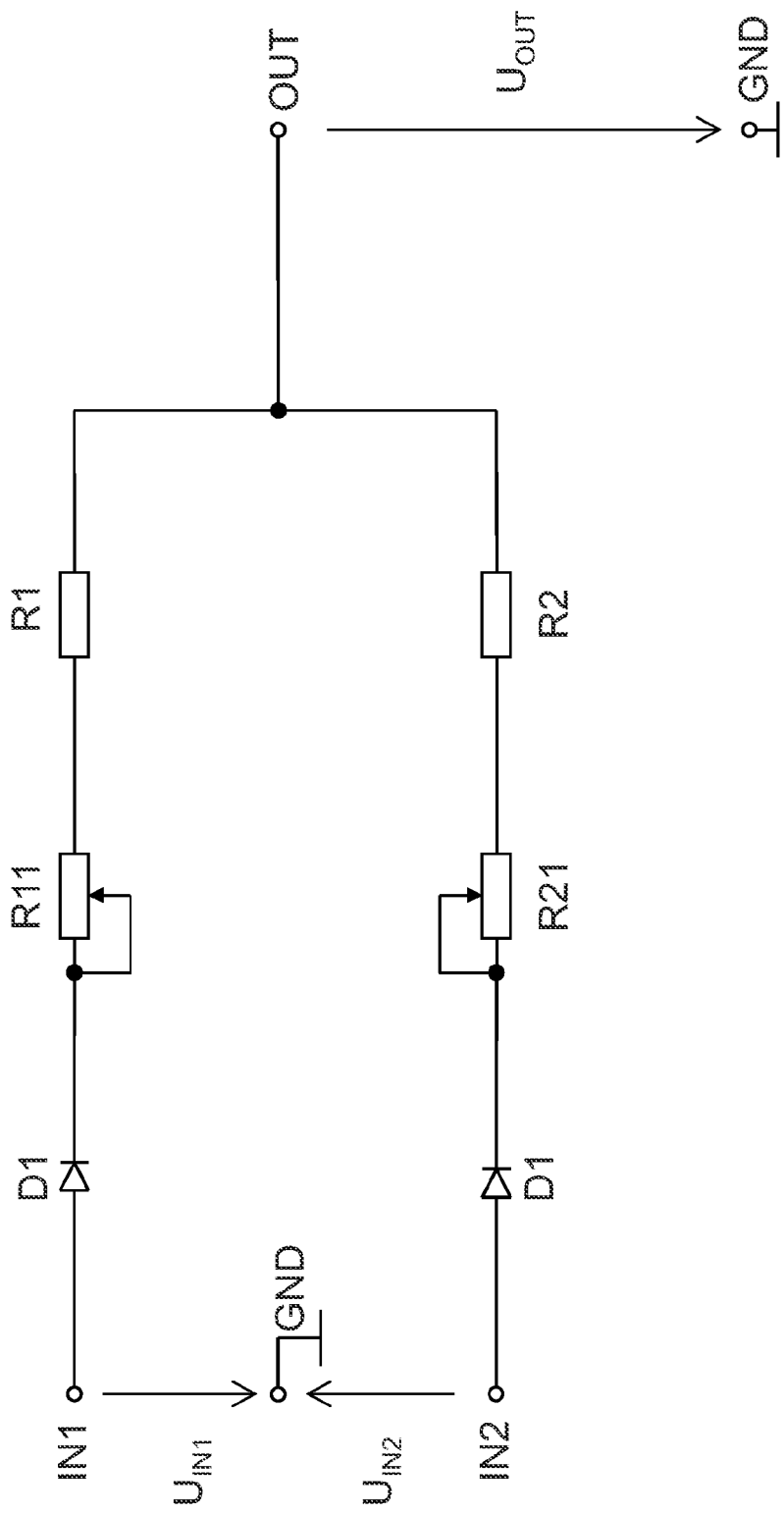
FIG. 1 shows the operation of a redundant module having two decoupling sections with variable resistors.

With reference to FIG. 1, the operation of a redundant module with two decoupling sections will be explained. Two power supply units, not shown in the figure, are connected to the inputs IN1 and IN2 of the redundant module on the secondary side thereof, and provide voltages U1 and U2 at the inputs of the current paths. A load, likewise not shown in the figure, which is to be powered by the redundant module can be connected to the output OUT of the circuit. The output forms a common current node for the outputs of the current paths of all decoupling sections. The reference potential GND is connected to the corresponding terminals of the power supply units.

Diodes D1 and D2 are decoupling diodes which are intended to prevent, in the event of a short-circuit of an input, a return current from the output OUT of the redundant module to the short-circuited input.

Variable resistors R1 and R2 are exemplary control elements of the control circuits by means of which the balance of currents among the current paths of the supplying power supply units can be regulated. The path currents are each measured by a respective measuring resistor, R1 and R2.

To regulate the balance of currents, the variable resistor of a first current path, that is the current path which has the lower input voltage applied at its input, is adjusted to the minimum resistance value. The variable resistor in a second current path, i.e. the other one of the two illustrated current paths, is the active control element of a regulation scheme which regulates the balance of currents. The sensed current data of the two current paths are supplied to a regulation device, the current of the path with the lower input voltage defining the target value for regulation of the second current path.

In function of the deviation to be regulated which results from the difference between the first and second path currents, the value of the active, variable resistor in the second current path is varied until both currents are equalized. The regulation process always influences both path currents, since the sum of the two path currents results from the total current at the output of the circuit which depends on the connected load and is constant in time, at least over periods.

The present invention allows parallel operation of three or more power supply units, by respectively defining the path current of the decoupling section to which the power supply unit with the smallest output voltage is connected as the target value of the control circuits for the other current paths. Since the sum of all path currents is defined by the load at the output, all current paths are balanced to each other with a symmetrical current load.

Figure 2:
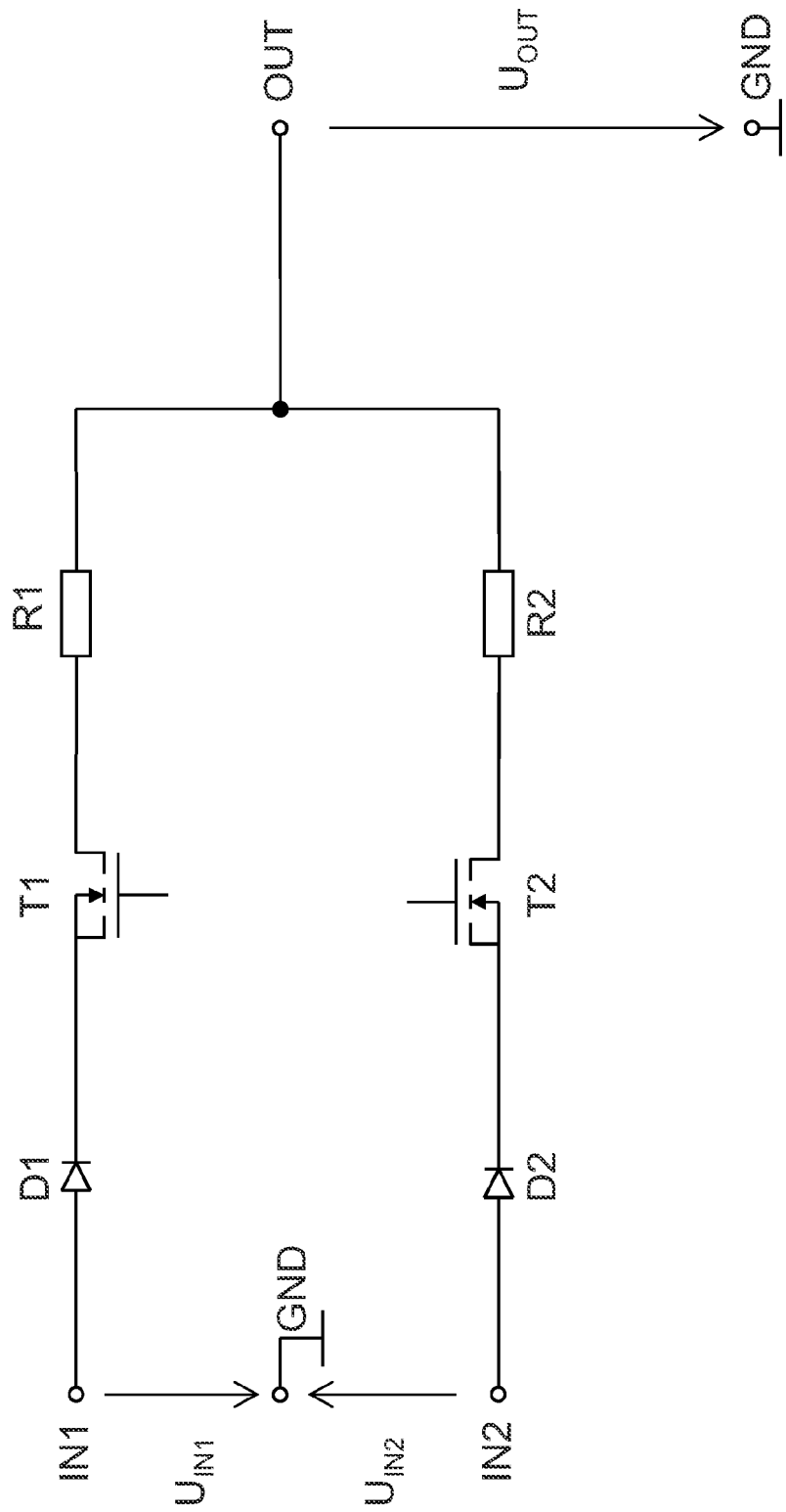
FIG. 2 shows a first embodiment of a redundant module having two parallel-connected decoupling sections each including a decoupling diode and a controllable or regulatable MOSFET.

FIG. 2 illustrates a first embodiment of two parallel decoupling sections, Diodes D1 and D2 are preferably provided in form of Schottky diodes which are distinguished by a low forward voltage of about 400 mV and thus produce lower power losses in the current paths as compared to silicon diodes. The variable resistors are shown as MOS transistors T1 and T2 operating in the linear regime. A circuit as illustrated allows to even out significant differences in the output voltages of the connected power supply units.

Figure 3:
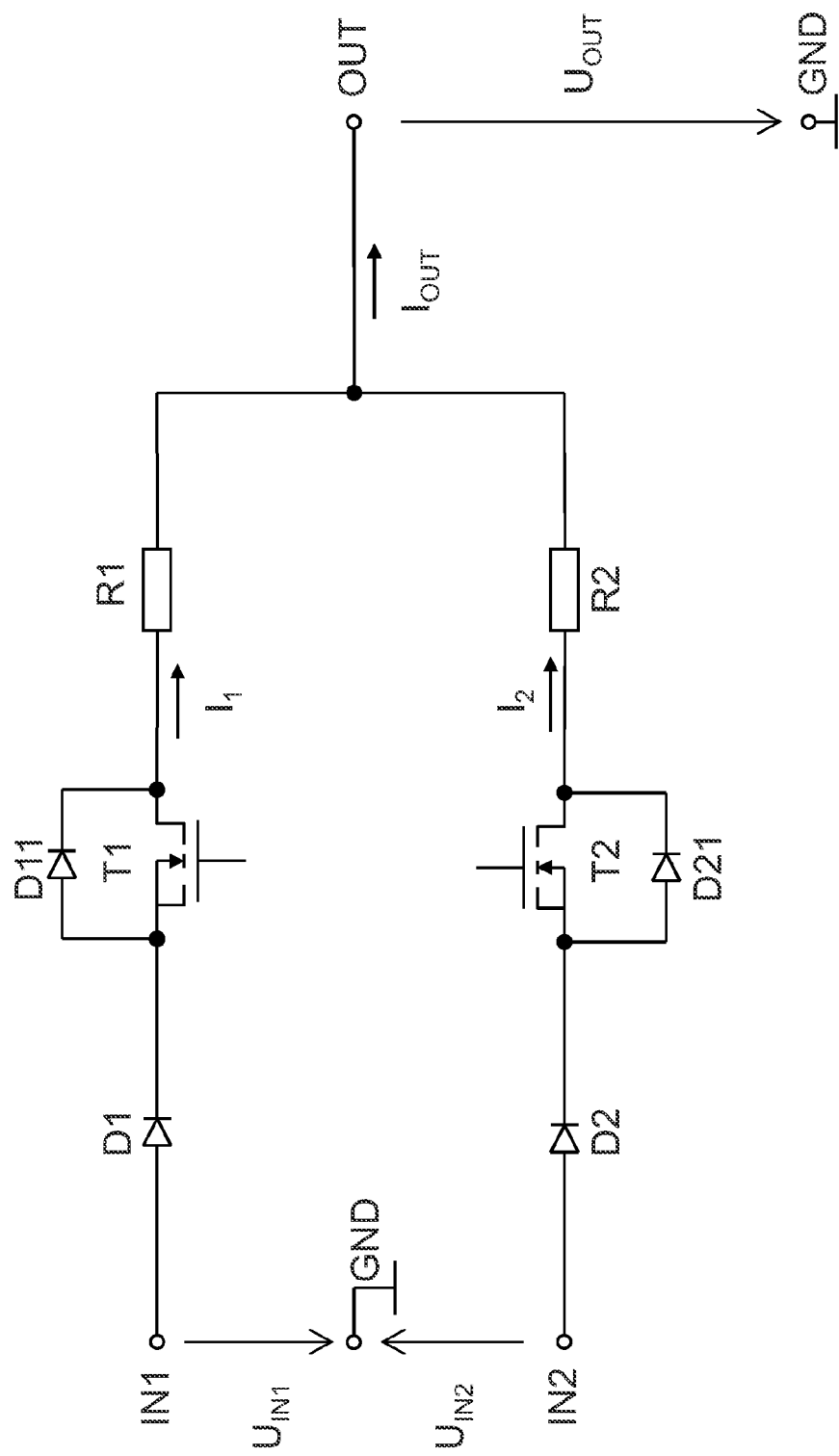
FIG. 3 shows a second embodiment of a redundant module having two decoupling sections, with a diode connected in parallel to each of the MOSFETs.

FIG. 3 shows another embodiment of a redundant module having two decoupling sections connected in parallel. In contrast to the illustration in FIG. 2, transistors T1 and T2 additionally have a respective diode, D11 and D21, connected in parallel thereto. These serve to protect against overcurrents, e.g. in the event of a short-circuit at the output of the redundant module. Once the voltage that drops between drain and source of the MOSFET exceeds the forward voltage of a respective diode, the latter may accommodate the path current and protect the transistor from breakthrough. Preferably, Schottky diodes are used as diodes D11 and D21. In this case, voltage differences in the power supply units of up to 400 mV can be compensated by regulating the path currents.

Figure 4:
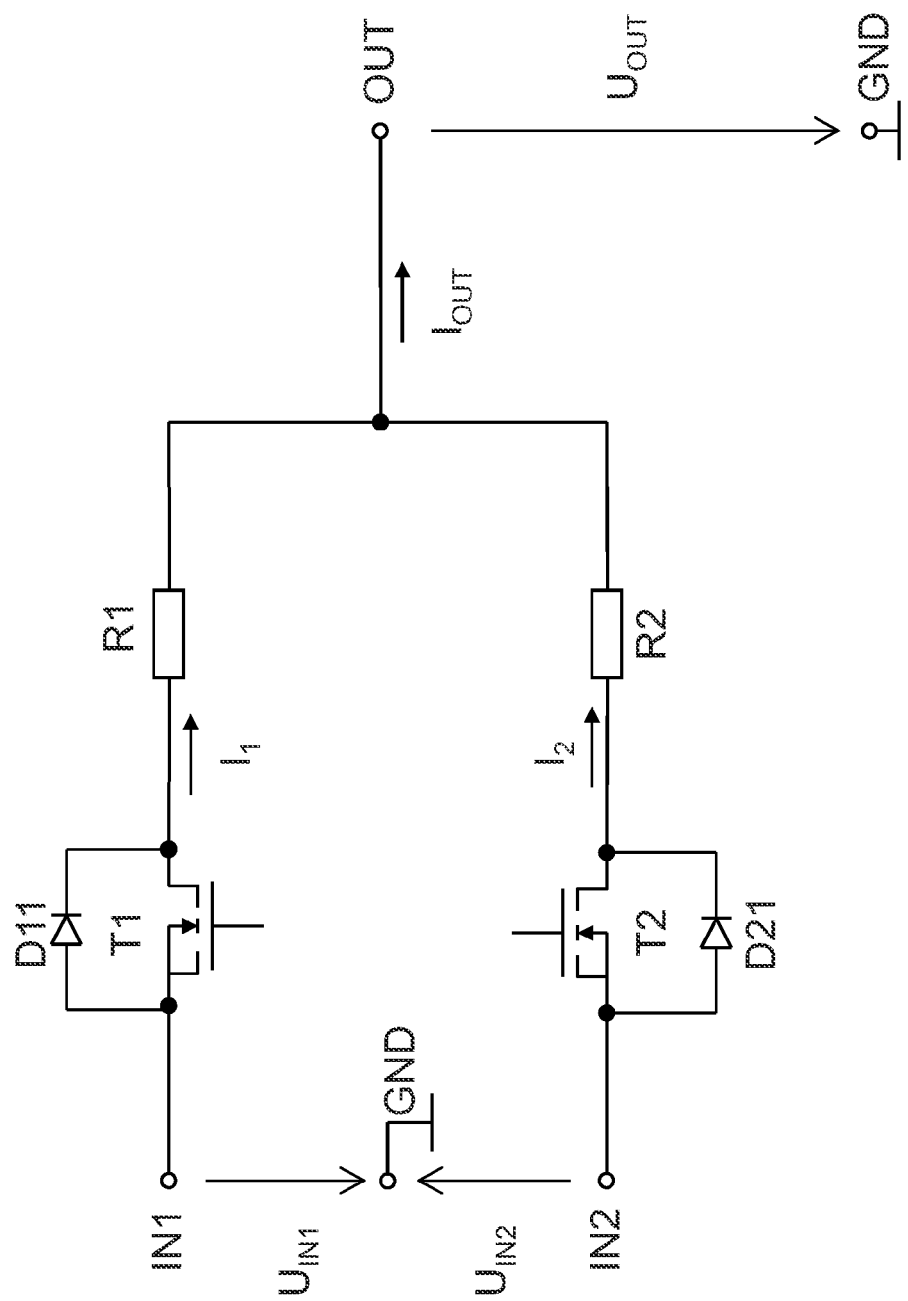
FIG. 4 shows a third preferred embodiment of a redundant module having two decoupling sections with controllable or regulatable MOSFETs and without decoupling diodes connected in series.

FIG. 4 illustrates a particularly preferred embodiment with two parallel-connected decoupling sections for a redundant module with symmetrically regulatable path currents. A particular advantage of an inventive redundant module is that, in principle, the decoupling diodes of conventional redundant modules can be dispensed with. As will be described below, the control and/or regulation device of an inventive redundant module comprises means which allow to monitor the input voltages. In the event of a short-circuit at the input side occurring in one of the power supply units, for example, the associated current path with the respective transistor can be switched off, so that a return flow of the output current from the current node is actively suppressed. Diodes D12 and D21 connected in parallel to the MOSFETs allow emergency operation of the redundant module in case of a failure of the regulation device and/or the transistors.

Figure 5:
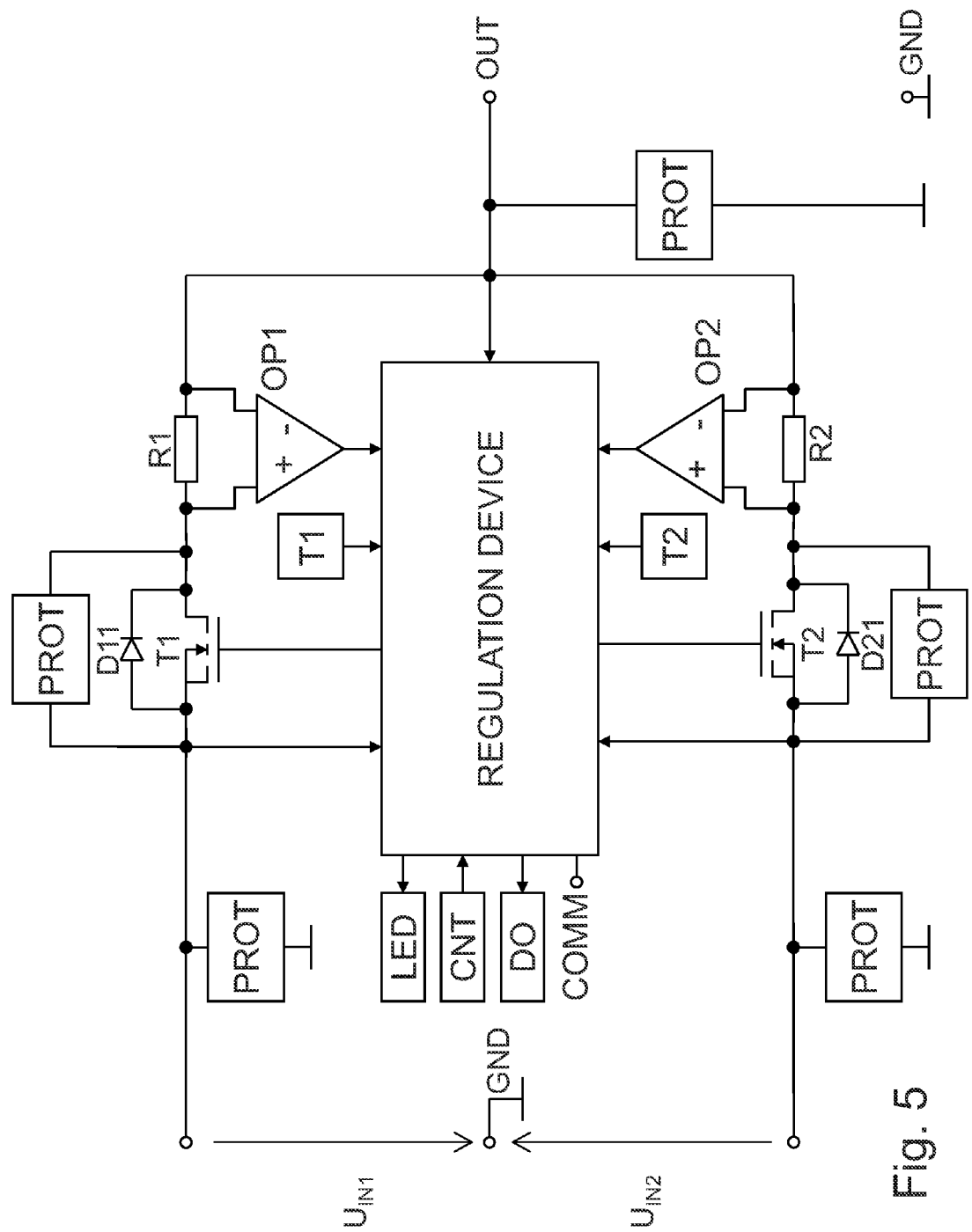
FIG. 5 shows a complete redundant module having two parallel operating decoupling sections and a control and regulation unit.

FIG. 5 shows a complete redundant module having two parallel operating decoupling sections and a control and regulation device connected to these modules. The regulation device is implemented, for example, by a microcontroller device and associated peripherals, and provides, in addition to the current regulation regime for the current paths, numerous input/output interfaces. These include, for example, the light-emitting diodes LED which are used for diagnostic purposes and to display operating modes, warnings, alarms, and errors, control elements CNT, e.g. for setting an operating mode, or digital outputs DO which are implemented using relay contacts or electronic drivers. Via the COMM interface, the redundant module may communicate with higher-level controllers of systems, devices, or machines.

The decoupling sections essentially correspond to those which have been described above with reference to FIG. 4, each one comprising a MOSFET, T1 and T2, respectively, with a Schottky diode, D11 and D21, respectively, connected in parallel thereto, and a low-impedance measuring resistor connected in series. Each decoupling section has a temperature sensor associated therewith which enables to monitor the MOSFETs for diagnostic purposes. The measuring resistors each have a sense amplifier, OP1 and OP2, respectively, connected in parallel thereto, for amplification of the sensed voltage difference, which is linearly related to the respective path current through the resistor.

At the input side, each decoupling section has a voltage tap by which the input voltage of each current path can be detected by the microcontroller of the regulation device.

Optionally, the inputs and the output of the redundant module may be connected to a protection circuit PROT which, for example, includes noise filters and/or overvoltage filters. The transistors of the current paths may also be connected to such protection circuits.

The two input voltages U1 and U2 are required for initiation of the regulation for a symmetric current distribution to the two redundant power supply units. To this end, first the voltages provided by the power supply units are tapped at the inputs of the redundant module and fed to the regulation device.

Voltages U1 and U2 allow the regulation device to check the operability of the connected power supply units. If any of the voltages falls to the reference potential or at least below a specified threshold value, the associated transistor in the corresponding current path can be blocked. The regulation device will not interpret this current path as the current path with the lowest input voltage. The reference value for regulation is provided by the current path having the lowest valid input voltage. If there only remains one current path carrying the total current, all current paths with loss of input voltage are switched off, and the control element of the path that carries the current is set to a minimum resistance value.

The invention claimed is:

1. A redundant module for decoupling short-circuit currents in a redundant voltage supply, comprising:
   at least two power supply units;
   a number of inputs which corresponds at least to a number of power supply units; and
   a control device, wherein each input is routed via a separate current path to a common current node of an output for providing an output current, wherein
   each current path forms a decoupling section, each decoupling section having associated therewith at least one measuring element for measuring input voltage, path current flowing through the current path, and/or input power, and a control element comprising a variable resistor, and the control device is connected with the variable resistor of each current path to control a balance of path currents by i) adjusting a variable resistor of a first current path with a lowest positive input voltage to a minimum resistance value, and ii) setting a variable resistor of a second current path as the active control element, the current of the first current path defining the target value for controlling the current of the second current path.

2. The redundant module as claimed in claim 1, wherein the control device is adapted for current, voltage, and/or power control and is connected to the measuring elements and the control elements.

3. The redundant module as claimed in claim 2, wherein the control device is adapted to symmetrically distribute the output current to the current paths, or to distribute the output current into path currents with defined ratios.

4. The redundant module as claimed in claim 1, wherein the control element comprises a MOSFET and the measuring element comprises a measuring resistor, said MOSFET and measuring resistor being connected in series in the current path of the decoupling section.

5. The redundant module as claimed in claim 4, wherein the MOSFET of each decoupling section has a diode connected in parallel thereto.

6. The redundant module as claimed in claim 1, wherein the measuring element of each decoupling section has a sense amplifier associated therewith.

7. The redundant module as claimed in claim 1, wherein each decoupling section comprises a decoupling diode connected in series with the respective control element and the measuring element.

8. The redundant module as claimed in claim 2, wherein the decoupling sections comprise measuring elements connected to the control device, for monitoring temperature.

9. The redundant module as claimed in claim 2, wherein the control device is adapted to detect a failure or a short-circuit in the power supply units at the input of the decoupling sections and to switch off an affected current path.

10. The redundant module as claimed in claim 2, wherein the control device comprises a number of digital and/or analog interfaces adapted for diagnosis, programming, and parameterization, and for communication with other control and regulation devices of a system, a machine, or a device.

11. The redundant module as claimed in claim 1, wherein at least a second redundant module is connected in parallel to the output, said parallel-connected redundant modules being adapted to communicate with each other and to provide a common control for a symmetrical or predefined current distribution to all decoupling sections.

12. A method for providing a redundant voltage supply having at least two power supply units and a redundant module according to claim 1, comprising the steps of:
 (a) determining the input voltages applied at the decoupling sections;
 (b) disabling the control elements in decoupling sections at which no voltage is applied;
 (c) adjusting the control element in the decoupling section at which a lowest positive input voltage is provided to a minimum resistance value;
 (d) determining current, voltage, and/or power measurement data in all decoupling sections; and
 (e) controlling the control elements of at least one further decoupling section, wherein the measured value of the decoupling section at which the lowest input voltage is applied is determined as a target value for a respective controlling.

13. The method as claimed in claim 12, including controlling the control element as a function of the current flowing through the decoupling section.

14. The method as claimed in claim 12, including controlling the control element as a function of its output voltage.

15. The method as claimed in claim 12, including continuously monitoring the input voltages at the inputs of the redundant module, and switching off the current through the associated decoupling section in case of failure or short-circuit of a power supply unit.

* * * * *